Feb. 20, 1951     H. D. EVANS     2,542,125

SHEARS

Filed Feb. 25, 1946

INVENTOR.
Harold D. Evans
BY
ATTORNEY.

Patented Feb. 20, 1951

2,542,125

UNITED STATES PATENT OFFICE 2,542,125

SHEARS

Harold D. Evans, Kansas City, Mo.

Application February 25, 1946, Serial No. 650,079

5 Claims. (Cl. 30—252)

This invention relates to shears of the character usually employed in trimming vegetation such as vines, trees or the like, and has for its primary aim, to provide a tool of that character including unique principles of leverage; means for guiding the jaws as they are relatively shifted to and from the cutting position; and specially formed handles having the ability of protecting the operator's hand and of serving as strengthening guides to preclude lateral displacement of the jaws as they are shifted about a common pivotal point.

Another important object of this invention is to provide shears of the aforementioned character, having elongated jaws, substantially L-shaped in form, and joined together at a point remote from the pivotal connection of the handles of the shears, so far as the distance between the pivotal connection of the handles and the connections between the two handles and jaws respectively, are concerned.

Other objects of the invention include the provision of shears having jaws of such form as to insure that a laterally extended part thereof will serve as means for preventing mal-adjustment with respect to undesirable displacement; having handles capable of being formed of sheet metal to present bifurcated, overlapping ends within which is confined the cutting jaws of the shears and between which the aforesaid lateral portions of the jaws are disposed to cooperate with the bifurcated handles in presenting an exceptionally strong assembly directly adjacent to the cutting edges of the implement; and having the parts thereof so formed as to prevent binding and to allow freedom of movement as the cutting edges are operated to and from a completely severing, overlapped relation.

Other aims of the invention will appear during the course of the following specification, referring to the accompanying drawing, wherein.

A pair of jaws 10 and 12 respectively, of elongated character, are joined at one end by pivot pin 14 and extended laterally from their inner edges at the opposite ends thereof, whereby to present a substantially L-shaped body. One leg of the body of each jaw 10 and 12 respectively, constitutes the main and relatively long part thereof, and it is the free ends of these legs that are overlapped and joined together by pivot pin 14. The other leg of each jaw 10 and 12, is extended inwardly to an overlapping condition, and a portion of these legs of each jaw 10 and 12, is sharpened to present a cutting edge 16.

Figure 3:
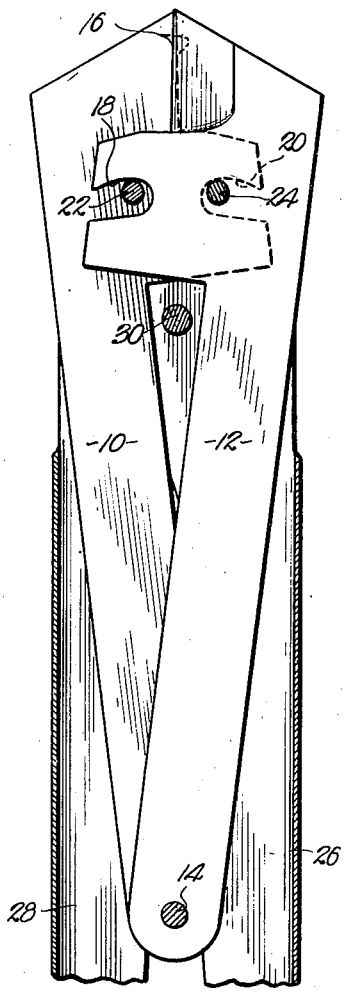
Fig. 3 is a longitudinal sectional view therethrough, taken on line III—III of Fig. 2.
Figure 4:
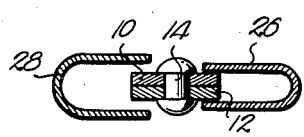
Fig. 4 is a transverse sectional view taken on line IV—IV of Fig. 1.

Jaw 12 has a slot 18 therein, formed as shown in Fig. 3, while a similar slot 20 is formed in jaw 10. These slots are within extended portions that project beyond the cutting edges 16 and receive transverse connectors 22 and 24, joining jaws 10 and 12 respectively, to handles 26 and 28.

Handles 26 and 28 are substantially U-shaped in transverse cross sectional contour substantially throughout their entire length, but the bight of each U-shaped handle is eliminated along the length thereof near the end joined to jaws 10 and 12. This elimination of the bight of each handle 26 and 28 presents a bifurcated portion on each handle and when the walls are in overlapped relation, as clearly shown in Figs. 1 and 2, jaws 10 and 12 may be mounted therebetween for free movement about pivotal pin 14.

Handles 26 and 28 are interconnected by pintle 30 and this pintle is located relatively close to connectors 22 and 24 and a substantial distance from pivot pin 14. Multiplied leverage is thereby imparted when the handles are moved together and to the full line position shown in Fig. 1. When in this position, cutting edges 16 are overlapped and a full cutting stroke is completed. When handles 26 and 28 are closed, substantially all of the lengths of jaws 10 and 12 between connectors 22 and 24 and pivot pin 14, are confined within the handles and a safety factor is presented. There is no possibility of pinching the hand of the operator when the shear is made as just described.

Figure 1:
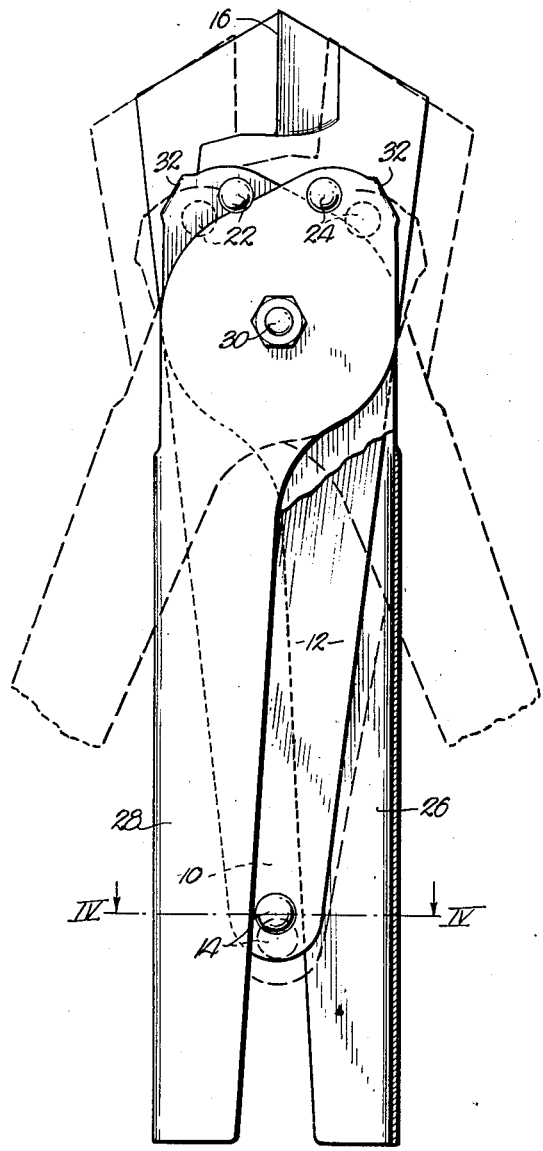
Fig. 1 is a side elevational view of the shears made pursuant to the present invention.

As movement occurs to and from the full line position illustrated in Fig. 1, slots 18 and 20 afford clearance for connectors 22 and 24, while the laterally extended portions of jaws 10 and 12 having said slots therein, serve as guides to prevent offsetting of the jaws and thereby a destructive inter-engagement of the cutting edges 16.

Figure 2:
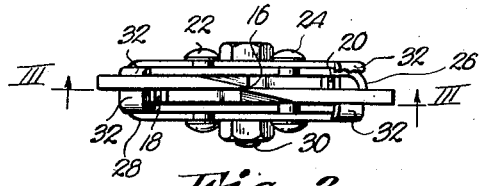
Fig. 2 is an end elevational view thereof.

To further confine the jaws to their normal planes, each wall formed by the bifurcated portion of each handle 26 or 28 as the case may be, has an inturned lug 32, as clearly shown in Fig. 2. Since there are four walls and four lugs, two of these lugs engage one jaw 10, while the other two engage jaw 12.

The relation between the parts just described, at the head of the shears, is such as to insure rigidity as movement occurs. The upper edges of the extended portions, having slots 18 and 20 therein, prevent the article being severed from contacting any part of the shears that would retard its action when an article is introduced between cutting edges 16 and after the parts of the tool are moved to the dotted line position shown in Fig. 1.

Complete freedom of action on the part of jaws 10 and 12 is insured, so far as their disposition is concerned with respect to pintle 30, and when shears are made as illustrated and described, this desired multiplication of forces will be attained.

Cutting edges 16 are substantially in parallelism throughout their path of travel. These edges are relatively short and because of the position of fulcrum points 14, 22, 24 and 30, the force exerted against the article being severed is practically uniform throughout the length of edges 16. These edges are straight and lie on a rectilinear line extending through fulcrums 14 and 30 when the shears are closed.

The paths of travel of edges 16 are practically straight due to their distance from pivot point 14 and the disposition of the edges with respect to the longitudinal axis of their respective jaws. When handles 26 and 28 are parted to the fullest extent, connections 22 and 24 constitute stops as shown in Fig. 1. Thus the length of the path of travel of edges 16 is short and a powerful force may be exerted.

Having thus described the invention, what is claimed as new and desired to be secured by Letters Patent is:

1. Shears of the character described comprising a pair of handles pivotally joined near one end; a pair of jaws pivotally joined at one end thereof; and a connector pivotally joining a handle with each of the jaws respectively, said connectors being spaced inwardly from the opposite ends of the jaws, the pivotal connection between the handles being between the pivotal connection between the jaws and the connectors and closer to the latter than the former, said jaws being in overlapping relation at the portions thereof between said connectors and the proximal ends thereof throughout the movement of the jaws from the closed to the fully open condition, said handles each having inturned portions thereon for engaging opposite sides of a jaw to guide the same as movement thereof occurs during shifting of the handles about their pivotal connection.

2. Shears of the character described comprising a pair of handles pivotally joined near one end; a pair of jaws pivotally joined at one end thereof; and a connector pivotally joining a handle with each of the jaws respectively, said connectors being spaced inwardly from the opposite ends of the jaws, the pivotal connection between the handles being between the pivotal connection between the jaws and the connectors and closer to the latter than the former, said handles each being bifurcated at the end thereof pivotally joined to the jaws and in overlapping relation to present opposed, substantially parallel walls, the said jaws being between the walls, the walls of each handle formed by the bifurcated ends thereof being provided with inturned guide legs to engage the jaws and preclude lateral shifting thereof during operation of the shears.

3. Shears of the character described comprising a pair of handles pivotally joined near one end; a pair of jaws pivotally joined at one end thereof; and a connector pivotally joining a handle with each of the jaws respectively, said connectors being spaced inwardly from the opposite ends of the jaws, the pivotal connection between the handles being between the pivotal connection between the jaws and the connectors and closer to the latter than the former, said jaws having relatively short, straight cutting edges at said opposite ends thereof, said jaws each having lateral extensions thereon at the inner ends of the cutting edges, said lateral extensions being in overlapping relation throughout the path of travel of the jaws and extending outwardly beyond the proximal ends of the handles whereby to hold material being severed between the cutting edges against contact with the handles.

4. Shears of the character described comprising a pair of handles pivotally joined near one end; a pair of jaws pivotally joined at one end thereof; and a connector pivotally joining a handle with each of the jaws respectively, said connectors being spaced inwardly from the opposite ends of the jaws, the pivotal connection between the jaws and the connectors and closer to the latter than the former, said jaws having relatively short, straight cutting edges at said opposite ends thereof, said jaws each having lateral extensions thereon at the inner ends of the cutting edges, said lateral extensions being in overlapping relation throughout the path of travel of the jaws and extending outwardly beyond the proximal ends of the handles whereby to hold material being severed between the cutting edges against contact with the handles, said connectors and said pivotal joinder between the handles cooperating to hold the extensions in relative sliding engagement whereby to hold said cutting edges against contact with each other as the same are moved together.

5. Shears of the character described comprising a pair of handles pivotally joined near one end; a pair of jaws pivotally joined at one end thereof and having opposed cutting edges at the opposite end thereof; and a connector pivotally joining a handle with each of the jaws respectively, said connectors being spaced inwardly from the opposite ends of the jaws, each connector extending into the path of travel of the opposite handle respectively, whereby to limit the extent of the cutting stroke of said cutting edges.

HAROLD D. EVANS.

REFERENCES CITED

The following references are of record in the file of this patent:

UNITED STATES PATENTS

| Number | Name | Date |
|---|---|---|
| 605,400 | Crockett | June 7, 1898 |
| 713,595 | Broman | Nov. 18, 1902 |
| 1,648,984 | Enell | Nov. 15, 1927 |
| 2,073,460 | Vosbikian | Mar. 9, 1937 |

FOREIGN PATENTS

| Number | Country | Date |
|---|---|---|
| 228,586 | Great Britain | Jan. 29, 1925 |